United States Patent [19]
Butter et al.

[11] Patent Number: 5,432,848
[45] Date of Patent: Jul. 11, 1995

[54] DES ENCRYPTION AND DECRYPTION UNIT WITH ERROR CHECKING

[75] Inventors: Adrian S. Butter, Binghamton, N.Y.; Chang Y. Kao, Boulder, Colo.; James P. Kuruts, Forest City, Pa.

[73] Assignee: International Business Machines Corporation, Armonk, N.Y.

[21] Appl. No.: 228,474

[22] Filed: Apr. 15, 1994

[51] Int. Cl.6 .......................... H04K 1/00; H04L 9/06
[52] U.S. Cl. ........................... 380/2; 380/29; 380/33; 380/37; 380/49; 380/50
[58] Field of Search ................... 380/2, 29, 33, 36, 37, 380/42, 49, 50, 21, 43, 44, 46, 47

[56] References Cited

U.S. PATENT DOCUMENTS

| | | | |
|---|---|---|---|
| 4,074,066 | 2/1978 | Ehrsam et al. | 380/29 X |
| 4,159,468 | 6/1979 | Barnes et al. | 380/50 X |
| 4,203,166 | 5/1980 | Ehrsam et al. | 380/45 |
| 4,229,818 | 10/1980 | Matyas et al. | 380/37 |
| 4,262,358 | 4/1981 | Marino, Jr. | 371/51.1 |
| 4,322,576 | 3/1982 | Miller | 380/29 |
| 4,639,548 | 1/1987 | Oshima et al. | 380/43 |
| 4,645,871 | 2/1987 | Bremer et al. | 380/2 |
| 4,754,482 | 6/1988 | Weiss | 380/48 |
| 5,077,791 | 12/1991 | Salihi | 380/29 X |
| 5,237,611 | 8/1993 | Rasmussen et al. | 380/21 |
| 5,297,208 | 3/1994 | Schlafly et al. | 380/49 |

*Primary Examiner*—Bernarr E. Gregory
*Attorney, Agent, or Firm*—Arthur J. Samodovitz

[57] ABSTRACT

An improved DES unit internally checks whether the DES algorithm is being performed without error. A standard DES algorithm performs an initial permutation of input data and then multiple rounds or iterations of the following: expanding part of a result of the initial permutation for the first iteration and a result of the previous iteration for the subsequent iterations, exclusive ORing a result of the expansion with key bits, performing a selection function on a result of the exclusive ORing, permuting a result of the selection function, and exclusive ORing a result of the permuting. In the improved DES unit, data check bits that correspond to the input data which has been expanded are exclusive NORed with key check bits that correspond to the key, and a result of the exclusive NORing is checked against a result of the exclusive ORing to identify any errors in the operation of the basic DES unit. Also, a check selection function is performed on the result of the exclusive ORing. A result of the check selection function is exclusive NORed with data check bits for another part of the input data to yield input data for input to the expanding function for a next iteration. Also, the improved DES unit checks for accuracy in processing an input key by permuted choicing the input key, key shifting a result of the permuted choicing, and checking a result of the key shifting against key check bits which correspond to the input key and bypass the permuted choicing and key shifting functions.

11 Claims, 5 Drawing Sheets

DES ENCRYPTION AND DECRYPTION UNIT WITH ERROR CHECKING

BACKGROUND OF THE INVENTION

The invention relates generally to cryptography, and deals more particularly with an encryption and decryption unit which includes circuitry to check that the encryption or decryption has been performed without error.

Private data is often encrypted or enciphered before transmission from a first site to a second site for security reasons. There are many known techniques or algorithms for encrypting data. For example, American National Standard for Information Systems (ANSI) standard X3.92-1981 defines one popular data encryption algorithm (DEA) for a data encryption standard (DES). This DES encryption/decryption algorithm is further defined in "Federal Information Processing Standard (FIPS) "Data Encryption Standard", by National Bureau of Standards, US Department of Commerce January 1977, and "Data Encryption Algorithm" by ANSI, standard #X-3.92-1981. These documents are hereby incorporated by reference as part of the present disclosure.

This algorithm provides four modes of operation (depending on the level of security required): electronic codebook (ECB) mode, cipher block chaining (CBC) mode, cipher feedback (CFB) mode and output feedback (OFB) mode. All of these modes require the DES encryption algorithm and a unique encryption/decryption key applied at the first site before transmission. Consequently, if an unauthorized party without the key (which is also required for decryption) intercepts the data, the party cannot understand the data even if the party possesses a DES decryption unit. The data is subsequently decrypted or deciphered at the second site by an authorized party using a DES decryption unit and the original key.

It is important to ensure that the encryption and decryption operations are performed accurately; errors can occur because of the many logical operations and shifts which are performed. One known technique is simply to feed the original data to two different and independent encryption units at the first site, and simply compare the final result of each unit to the other. If they are both identical then it is assumed that both encryption units performed flawlessly. If they differ, then it is assumed that at least one of the encryption units is in error and the encryption process is repeated in each encryption unit. Similarly, the encrypted data is fed to two different and independent decryption units at the second site and if the final result of each decryption unit is the same as the other, then it is assumed that both decryption units performed flawlessly. If they differ, then it is assumed that at least one of the decryption units is in error and the decryption process is repeated in each decryption unit. While this technique performs satisfactorily, it requires a doubling of the encryption and decryption hardware, and does not reveal an error until after the entire encryption or decryption algorithm has been performed.

Accordingly, a general object of the present invention is to provide an encryption/decryption unit with comprehensive error checking which requires less overall hardware than the redundant technique of the prior art and detects some errors before the entire encryption or decryption algorithm has been performed.

SUMMARY OF THE INVENTION

The invention relates to an improved DES unit which internally checks whether the DES algorithm is being performed without error. The standard DES algorithm performs an initial permutation of input data and then multiple rounds or iterations of the following: expanding part of a result of the initial permutation for the first iteration and a result of the previous iteration for the subsequent iterations, exclusive Oring a result of the expansion with key bits, performing a selection function on a result of the exclusive Oring, permuting a result of the selection function, and exclusive ORing a result of the permuting. The standard DES algorithm also performs inverse initial permutation on the result of the last iteration. According to the present invention, data check bits that correspond to the input data which has been expanded are exclusive NORed with key check bits that correspond to the key, and a result of the exclusive NORing is checked against a result of the first exclusive ORing to identify any errors in the operation of the basic DES unit.

According to another feature of the present invention, a check selection function is performed on the result of the first exclusive ORing. A result of the check selection function is exclusive NORed with data check bits for another part of the input data to yield input data for input to the expanding function for a next iteration. Thus, the check function that checks the result of the exclusive NORing against the result of the first exclusive ORing checks the selection function, permute function and second exclusive OR function of the current iteration and the expand function and first exclusive OR function of the next iteration.

According to another feature of the present invention, the improved DES unit also checks for accuracy in processing an input key to yield the aforesaid "key bits", by permuted choicing the input key, key shifting a result of the permuted choicing, and checking a result of the key shifting against key check bits which correspond to the input key. The key check bits for the first iteration bypass the permuted choicing and key shifting functions. The improved DES unit also generates key check bits based on the output of the first key shifting.

BRIEF DESCRIPTION OF THE FIGURES

FIGS. 4(a-d) form a block diagram of a DES encryption/decryption unit including error checking according to the present invention.

DETAILED DESCRIPTION OF THE PREFERRED EMBODIMENTS

Prior Art Encryption/Decryption Algorithm

Figure 1:
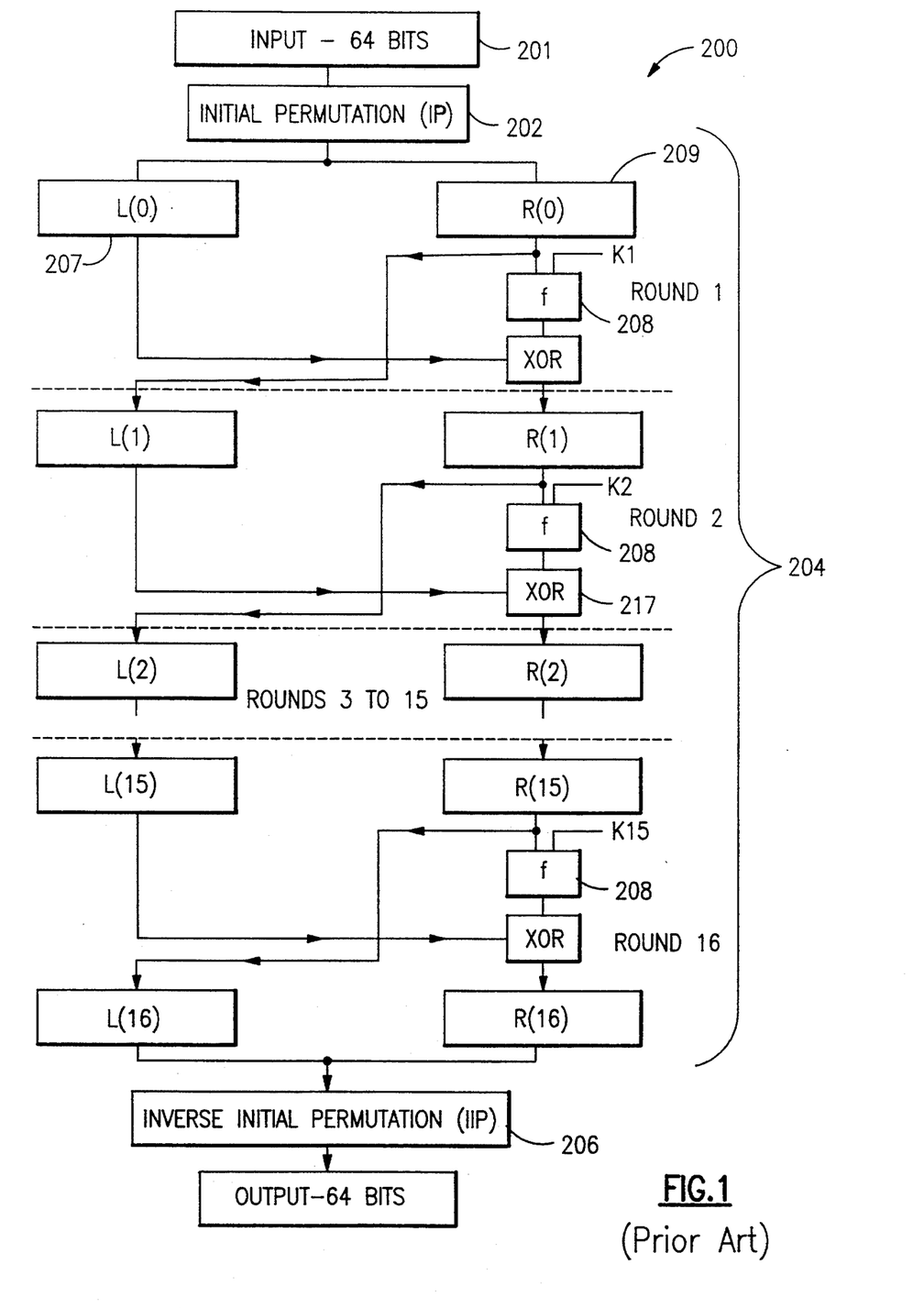
FIG. 1 is a block diagram of a prior art DES encryption/decryption unit.
Figure 2:
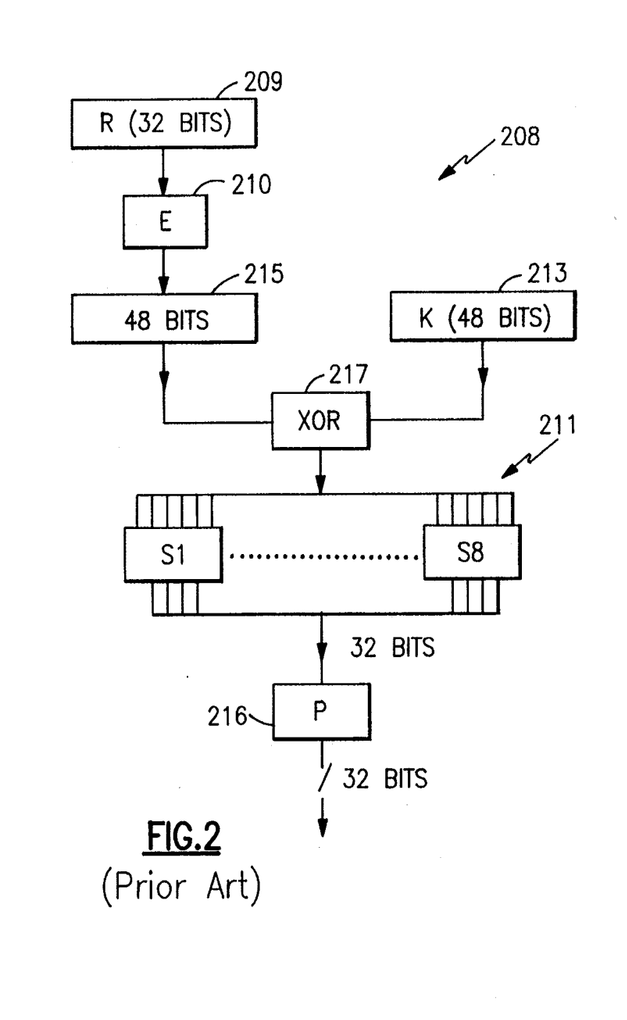
FIG. 2 is a block diagram of an iterative prior art "f" function within the DES unit of FIG. 1.

Referring now to the Figures in detail wherein like reference numerals indicate like elements throughout the several views, FIG. 1 illustrates a DES unit 200 according to the prior art ANSI standard X 3.92-1981 that can perform both encryption and decryption. The DES algorithm performed by DES unit 200 comprises a sixty-four bit initial permutation 202, sixteen computational "rounds" or iterations 204 of data involution, and finally a sixty-four bit inverse initial permutation 206. In each round, the right half of data is input to a function "f" 208, and the left half undergoes a bit by bit exclusive OR (XOR) with the output of function f. As illustrated in FIG. 2, in each of the sixteen rounds 204, the other input of function f is a forty-eight bit partial key 213. Outputs L(16) and R(16) (FIG. 2) are concatenated and subjected to inverse initial permutation for final sixty-four bit DES output.

Table 1 defines the initial permutation function 202 in which the permuted input has bit fifty-eight of the input as its first bit, bit fifty as its second bit, and so on with bit seven as its last bit.

FIG. 2 illustrates function f 208. Expand function "E" 210 receives a block of thirty-two bits as inputs and yields a block of forty-eight bits as output, using an E bit selection table as shown in the Table 2. Let E be such that the forty-eight bits of its output, written as eight blocks of six bits each, are obtained by selecting the bits in its inputs in order according to Table 2. Thus, the first three bits of E(r) are the bits in positions thirty-two, one and two of r while the last two bits of E(r) are the bits in positions thirty-two and one.

The function f also uses selection functions S1, S2, ... S8, each of which takes a six-bit block as input and yields a four-bit block as output. According to Table 3, if S1 is the function defined in the table and B is a block of six bits, then S1(B) is determined as follows. The first and last bits of B represent in base two a number in the range zero-three. Let that number be i. The middle four bits of B represent in base two a number in the range zero-fifteen. Let that number be j. Look up in the table the number in the i'th row and the j'th column. It is a number in the range zero-fifteen and is uniquely represented by a four-bit block. That block is the output S1 for the input B. For example, for input 011011 the row is 01, that is row one, and the column is determined by 1101, that is column thirteen. In row one column thirteen appears five so that the output is 0101. Thus, the first three bits of E(R) are the bits in position thirty-two, one and two while the last bits in positions thirty-two and one. Selection functions S1, ... S8 are also known as S-boxes (look-up-tables). The six bits of each S1-S8 functions are viewed as an index into one of the eight S-boxes. An S-box provides sixty-four entries of four bits each, so the results of all eight look-up operations will yield a thirty-two bit output block.

Table 4 illustrates permutation function "P" 216. The outputs for the function P are chosen from the inputs using this table. Thus, input bits sixteen, seven, twenty ... four, twenty-five of function P are permuted to output bits one, two, three, ... thirty-one, and thirty-two.

Figure 3:
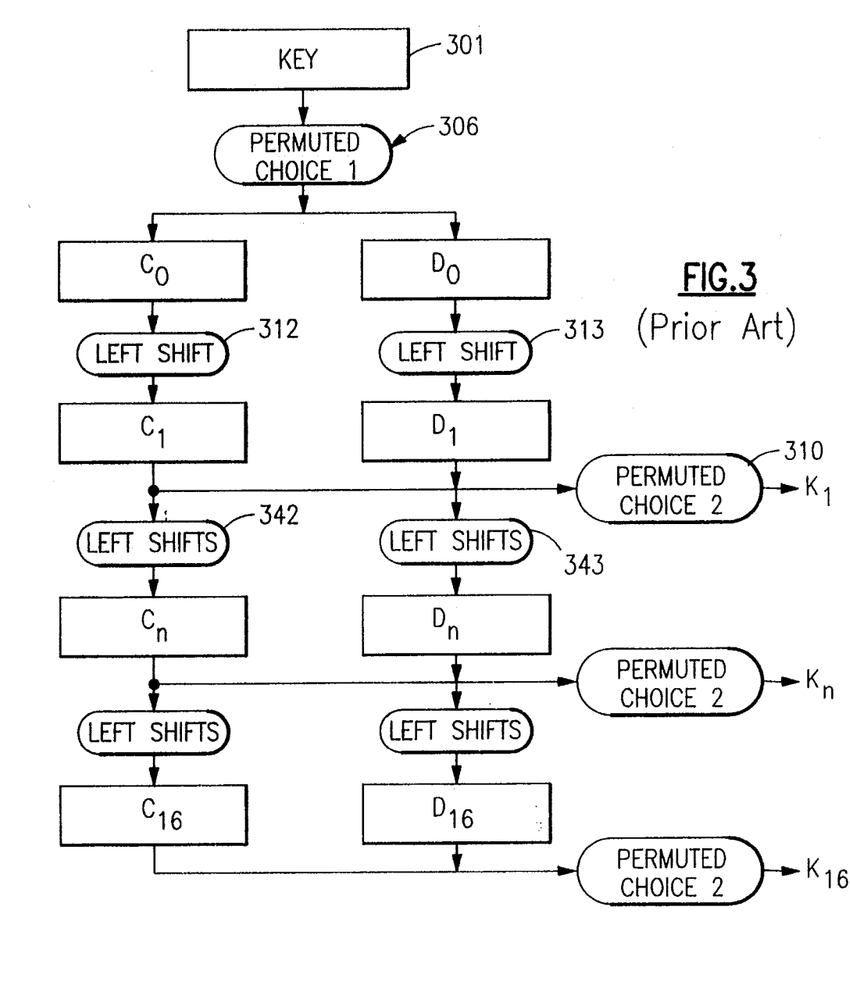
FIG. 3 is a block diagram of a prior art function which generates Ki values for the DES unit of FIG. 1.

The DES function illustrated in FIG. 1 also requires that each round has as inputs to its function f 208 an iteration of the original input key. Each K1 through K16 is derived by means of the method shown in FIG. 3. The function of FIG. 3 requires first a permutation of the input key as defined by permuted choice-1 (PC-1) 306 of table six. This table determines C0 and D0 values. The bits of C0 are bits fifty-seven, forty-nine, forty-one, ... forty-four and thirty-six of the input key, respectively and the bits of D0 are the bits sixty-three, fifty-five, thirty-seven, ... twelve and four of the input key, respectively. Next, C1–C16 and D1–D16 are determined by left shifts 312 indicated by Table 7. For example, C3 and D3 are determined from C2 and D2, respectively, by two left shifts, and C16 and D16 are determined from C15 and D15, respectively, by one left shift. Next, K1–K16 are determined from C1–C16 and D1–D16, respectively by concatenating the two twenty-eight bit wide values C(n) and D(n) together and then permutating this fifty-six bit value as defined by permuted choice-2 (PC-2) 310 as indicated in Table 8. For example, the first bit of Kn is the fourteenth bit of the fifty-six bit value, the second bit of K(n) is the fourteenth is the seventeenth bit of this fifty-six bit value, the forty-seventh bit of K(n) is the twentyninth bit of the fifty-six bit value.

Table 9 illustrates the inverse initial permutation function 206. The output of function 206 has bit forty of the preoutput block as its first bit, bit eight as its second bit, and so on, until bit twenty-five of the pre-output block is the last bit of the output. At the circuit level, DES unit 200 can be implemented as in U.S. patent application Ser. No. 07/916,777, filed by C. Y. Kao et al., on Jul. 17, 1992, now U.S. Pat. No. 5,317,638, which patent is hereby incorporated by reference as part of the present disclosure.

Figure 4A:
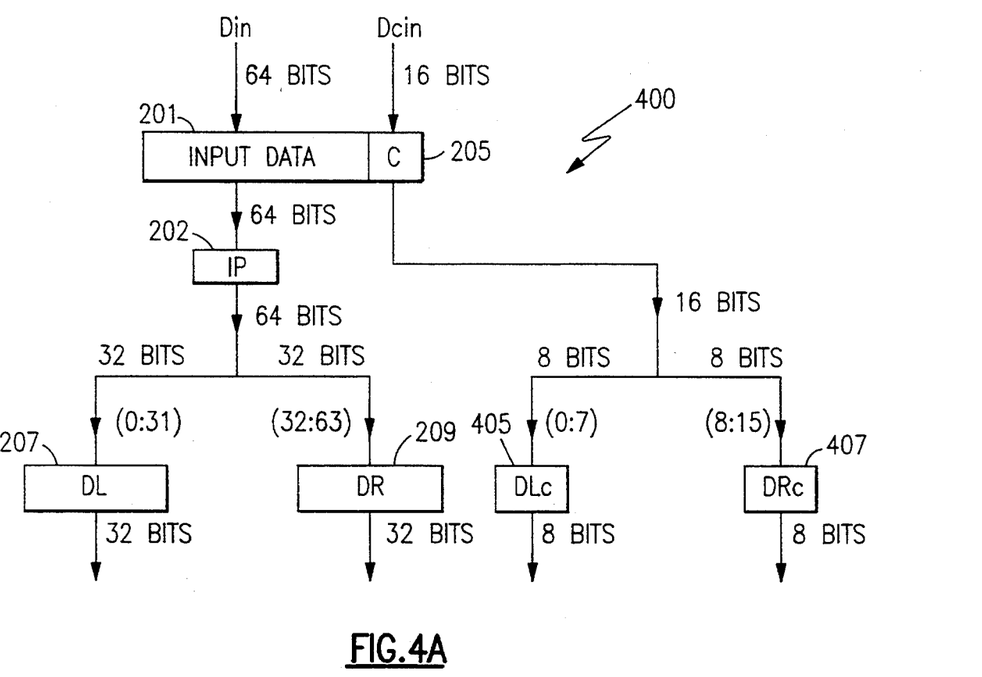
Figure 4B:
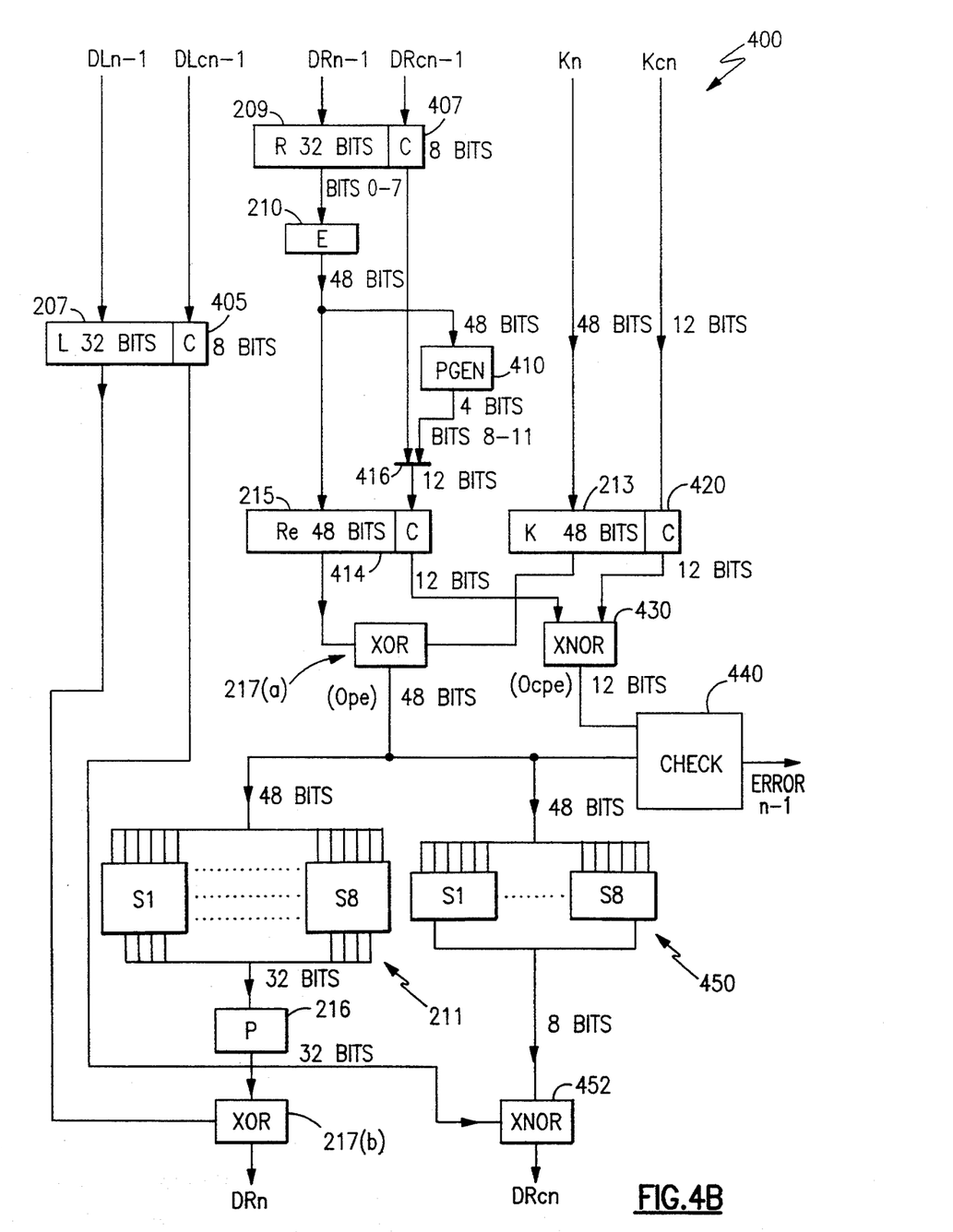

FIGS. 4(a-d) illustrate an improved DES unit 400 which comprises the prior art DES unit 200 and error checking according to the present invention. FIG. 4(a) illustrates input data 201, corresponding data check bits 205, the initial permutation unit 202 and splitting of the output of unit 202 and the data check bits. As noted above and shown in FIG. 4(b), each of the sixteen computational rounds or iterations consists of the following:

Expand unit 210 which expands thirty two bits to forty eight bits as in Table 2;

XOR unit 217(a) which performs an exclusive-OR operation between the expanded data and forty eight key bits 213;

Selection (Sn) unit 211 which converts eight, six bit input words to eight respective four bit output words via an S-box table lookup as in Table 3;

Permute unit 216 which performs a thirty two bit permutation operation as in Table 4; and XOR unit 217(b) which performs an exclusive-OR operation between the permuted data and thirty two bits of left half data.

Figure 4C:
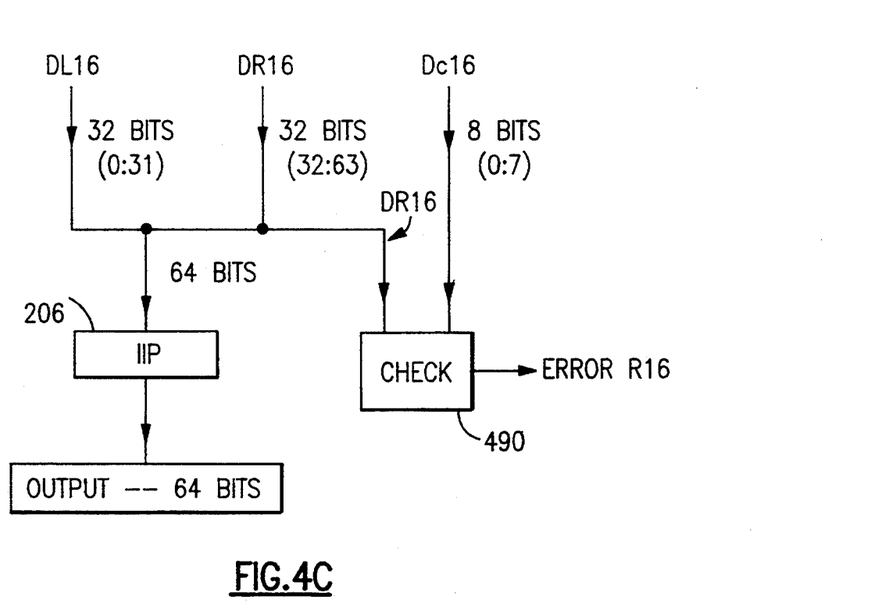
Figure 4D:
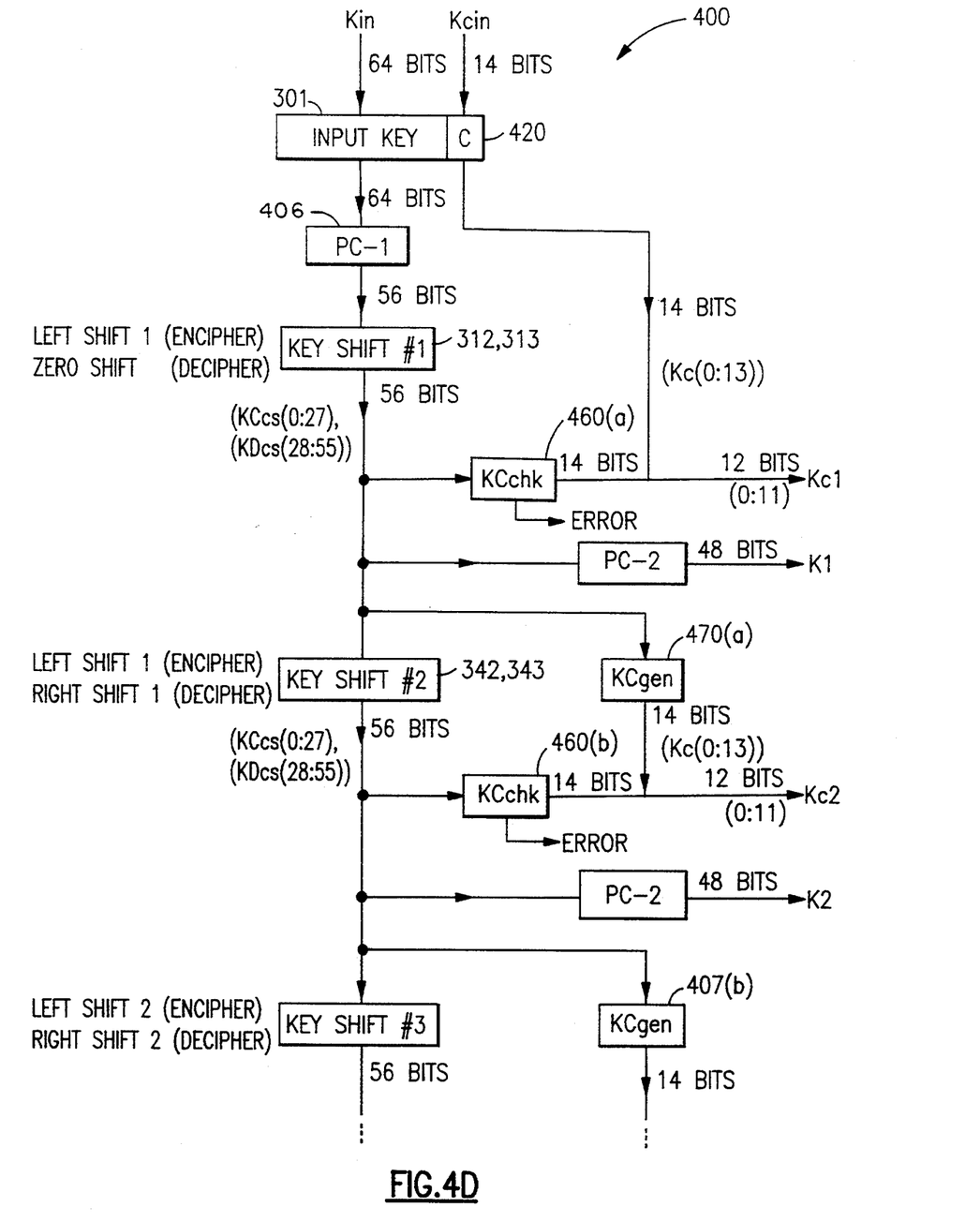

FIG. 4(c) illustrates the inverse initial permutation unit 206 that follows the last round of computation and a check unit 490 which is described below. FIG. 4(d) illustrates a key bit generation and checking algorithm. Only the XOR units 217(a,b) and Sn units 211 can alter the value of bits in the data path. The permutation and expansion units for both data and key only shift the bits to different relative positions. In view of the logical and shift operations, the error checking technique of the present invention requires proper, initial data and key check bits for predetermined groups of data and key bits such that when the DES operations are checked at various stages, the proper data and key check bits are aligned.

The initial check bits 205 are divided into two halves 405 and 407 for the left and right halves of initial permuted data 207 and 209, respectively. In order for the initial check bits 405 associated with the initial permuted (left half) data 201 to properly align with the check bits generated by Snc 450 (described below), the alignment and grouping of the initial check bits 405 must account for the effects of the initial permutation stage 202, S1-S8 stage 211 and permute stage 216. Also, in order for the initial check bits 407, associated with the initial permuted (right half) data 209, to properly align with the key check bits Kcn 420, the alignment and groupings of the check bits 407 must account for the effects of initial permutation stage 202 and expand stage 210. After accounting for these factors, the input check bits 205 which provide the required alignment at the XOR units 217($a,b$) is as shown in Table 10. In Table 10, DCin bits zero through seven represent the initial check bits for the left (DL) thirty two bits 207 based on the four bit combinations of the original input data bits indicated in Table 10. For example, the zero-th check bit for the DL left thirty two bits is based on the parity of the fifty ninth, sixty first, thirteenth and fifteenth bits of the original input data. Similarly in Table 10, DCin bits eight through fifteen represent the initial check bits for the right (DR) thirty two bits 209 based on the four bit combinations of the original input data bits indicated in Table 10.

Referring again to FIG. 4($b$), expand unit 210 expands the number of bits from thirty two to forty eight via bit duplication, and realigns the bits input to it. In order to provide checking for the duplicated bits, parity generation (PGEN) unit 410 generates four additional check bits based upon the output positions of the sixteen duplicated bits from expand unit 210. Table 11 shows the association between the generated check bits and the output from the expand unit 210. Note that the check bits provide odd parity in the illustrated embodiment. Parity generator 410 determines a set of four check or parity bits based on a respective group of the forty eight bits output from expand unit 210. The four parity bits have binary significance of positions eight through eleven and are based on four bit combinations of the forty eight bits from expand unit 210 as defined in Table 11. For example, the parity bit with binary significance of two to the fourth power is based on the parity of bits six, seven, twelve and thirteen of the output of expand unit 210. Next, the four higher order bits output from parity generator 410 are joined with the eight lower order parity bits from check word 407 into twelve bit word 414 via merger unit 416 (without change). FIG. 4($b$) also illustrates sixteen, twelve bit parity words Kcn 420 for the forty eight Kn key bits 213 in each of the sixteen computational rounds. The origin of Kn and Kcn are described below.

Each computational round also includes the XOR unit 217($a$) where the expanded form of the right half of data values Re and key values Kn are combined. FIG. 4($d$) illustrates the generation of Kn and Kcn. The initial key value Kin is input to the permutation stage PC-1, which not only realigns the input key bits, but also causes eight key bits to be dropped. The result is then input to Key Shift #1, which rotates the upper and lower twenty eight bits of the input to the left by one bit position when an encryption operation is being performed, or passes the input unchanged when a decryption operation is being performed. The output from this stage is then input to the permutation stage PC-2, which again realigns the input and drops eight bits to provide the first forty eight bit key value K1 to the first computational round of the DES algorithm. The output of Key Shift #1 is also provided to Key Shift #2, which rotates the upper and lower twenty eight bits of the input to the left or right by one bit position when an encryption or decryption operation, respectively, is being performed. The result is then passed through PC-2 to obtain the second forty eight bit key value K2 for use in the second computational round of the DES algorithm. These key shift and permute operations are repeated until the required sixteen key values Kn have been generated.

It is necessary to define the key check bits Kcn 420 to properly align with the check bits generated by Snc and thus, the data bit groups output from S1 through S8 211, followed by the permute stage 216 and the expand stage 210. Furthermore, the fact that the input key Kin 301 passes through PC-1, followed by Key Shift #1, followed by PC-2 must be considered in order to determine proper initial key check bit association. An added complication in determining the proper check bit assignment is the difference in Key Shift #1 stage function for encryption and decryption operations. Consequently, different check bit assignments are required for encryption and decryption operations. After accounting for these factors, the input key check bit (Kcin) association which provides the required alignment at stage exclusive NOR 430 is as defined in Table 14 and Table 15 for encryption and decryption, respectively. In Tables 14 and 15, each of the fourteen parity bits is based on parity of a corresponding four bit combination of the input key Kin 301. For example, for the encryption function, the zeroth parity bit is based on the parity of the combination of the forty first, fortieth, fifty second and sixty first bits of the input key 301.

Due to the nature of the Key Shift operations 312,313 342,343, etc. performed on the fifty six bit key value, there is no feasible way of predicting the check bit values for the final shift stage output based solely on the check bit input values. Therefore, in order to assure that the shift operations are performed properly, it is necessary to check for proper (odd) key parity at the output of each Key Shift stage, and generate key check bits for the next Key Shift stage. These operations are performed by KCchk unit 460($a,b,$ . . . ) and Kcgen unit 470($a,b,$ . . . ), respectively. For the first round, this verification is performed in KCchk unit 460($a$) which receives as inputs the fourteen bit parity word 405 and the fifty six bits output from Key Shift units 312,313. The KCchk unit 460($a$) operates on these inputs as defined in Table 16. If all fourteen bits output from the KCchk unit 460($a$) are zero, then there are no errors. For example, the zeroth bit output from KCchk unit 460($a$) is based on an exclusive ORing of the ninth, first, forty fourth and thirty fifth bits output from key shifters 312,313 and the zeroth bit of the parity word 405. The first twelve bits of the parity word 405 also forms the twelve bit Kcn word for the first round of permutation of FIG. 4($b$). KCchk unit 460($b$) receives as inputs the fifty six bits output from Key Shift units 342,343 and the fourteen bits output from KCgen unit 470($a$). The KCgen unit 470($a$) receives as inputs the fifty six bits output from the previous Key Shift units 312,313 and generates the fourteen output bits as defined in Table 17. Table 17 comprises four matrices which correspond respectively to the four combinations of amount and direction of the shifting of each stage—left one bit, left two bits, right one bit and right two bits. For example, for the left one bit of shifting performed by Key Shift units 312,313, the top matrix is used for key checking, and the zeroth output is based on exclusive ORing the tenth, second, forty fifth and thirty sixth bits of the output of Key Shift units 342,343 and the zeroth bit output from KCgen unit 470($a$). If all the outputs from the KCchk unit 460($b$) are zero, then there are no errors. The first twelve bits of the output of KCgen unit 470($a$) also form the twelve bit Kcn word for the second round of permutation of FIG. 4($b$).

Referring again to FIG. 4(b), due to the nature of the S-box transformation 211, it is not possible to predict the output data check bits for Sn based solely upon the input data check bits. For this reason, the check bit path is broken at the input to Sn. Assuming that the input data to the XOR unit 217(a) has associated data and key bits 215 and 213 which are properly aligned, it is possible to verify the output data check bits by performing an exclusive-NOR operation 430 between corresponding input data and key bits 414 and 420, and then checking for proper (odd) data parity via Check unit 440.

Check unit 440 performs an exclusive NOR operation on each of twelve four bit combinations of the forty eight data bits 215 and one bit of the output of exclusive NOR unit 430 as defined in Table 12. If the result is zero for all twelve tests, then there is no error so far in the DES algorithm. For example, the first test comprises an exclusive OR operation of the eleventh, twenty third, thirty third and forty fifth bits of the output of exclusive OR unit 217(a) and the zeroth bit of the output of exclusive NOR unit 430.

Next, DES unit 400 generates the data check bits 407 for the next round or iteration in order to check the selection function 211, permute function 216 and exclusive OR function 217(b) of the current iteration and the expand function 210 and exclusive OR function 217(a) of the next iteration. The data check bits for this next iteration are generated by eight selection units 450 (S1c–S8c) and exclusive NOR unit 452; units 407-440 described above use the output of exclusive NOR unit 452. Each of the eight selection units 211 receives a block of six consecutive bits from the output of exclusive OR unit 217(a), i.e. selection unit S1c receives the first six bits, selection unit S2c receives the next six bits, etc. Table 13 includes a matrix for each selection unit. The first two bits of each block determine the row and the remaining four bits of the block determine the column of the respective matrix. The resultant entry in the matrix is the output for that selection unit. Thus, the eight selection units output eight bits. Because each S-box transformation 211 provides a four bit output value, the check bit output by Snc is associated with a four bit quantity. This particular check bit association also has the advantage of offering improved protection against double bit errors. These eight bits from Table 13 are supplied to exclusive NOR unit 452 along with the eight parity bits 405 for the left half of the original input data. The output of exclusive NOR unit 452 provides the check bits DRcn-1 for the right half data DRn-1 for the next round. The right half data DRcn-1 for the next round is provided by the output of exclusive-OR unit 217(b).

FIG. 4(c) illustrates the inverse initial permutation unit 206 that follows the last round of computation and a check unit 490 which function as follows. The thirty two bit left hand data DL16 and thirty two bit right hand data DR16 resulting after the last round of computation are contatenated together to form a single sixty four bit value. This sixty four bit value is then passed through the inverse initial permutation unit 206 to form the sixty four bit result. Because the resultant thirty two bit left hand data DL16 was previously checked as an input to R15, only the right hand portion DR16 needs to be checked. Check performs the parity check function on groups of bits of DR16 as defined in Table 18. Because both the contatenation and inverse initial permutation are only bit manipulations, the final result does not have to be checked.

Based on the foregoing, a DES unit for encryption and decryption with error checking according to the present invention has been disclosed. However, numerous modifications and substitutions can be made without deviating from the scope of the present invention. Therefore, the invention has been disclosed by way of illustration and not limitation, and reference should be made to the following claims to determine the scope of the present invention.

TABLE #1

Initial Permutation (IP)

| 58 | 50 | 42 | 34 | 26 | 18 | 10 | 2 |
|---|---|---|---|---|---|---|---|
| 60 | 52 | 44 | 36 | 28 | 20 | 12 | 4 |
| 62 | 54 | 46 | 38 | 30 | 22 | 14 | 6 |
| 64 | 56 | 48 | 40 | 32 | 24 | 16 | 8 |
| 57 | 49 | 41 | 33 | 25 | 17 | 9 | 1 |
| 59 | 51 | 43 | 35 | 27 | 19 | 11 | 3 |
| 61 | 53 | 45 | 37 | 29 | 21 | 13 | 5 |
| 63 | 55 | 47 | 39 | 31 | 23 | 15 | 7 |

TABLE #2

E Bit-Selection.

| 32 | 1 | 2 | 3 | 4 | 5 |
|---|---|---|---|---|---|
| 4 | 5 | 6 | 7 | 8 | 9 |
| 8 | 9 | 10 | 11 | 12 | 13 |
| 12 | 13 | 14 | 15 | 16 | 17 |
| 16 | 17 | 18 | 19 | 20 | 21 |
| 20 | 21 | 22 | 23 | 24 | 25 |
| 24 | 25 | 26 | 27 | 28 | 29 |
| 28 | 29 | 30 | 31 | 32 | 1 |

TABLE #3

Primitive Functions. ($S_1, S_2, \ldots S_8$)

$S_1$

| 14 | 4 | 13 | 1 | 2 | 15 | 11 | 8 | 3 | 10 | 6 | 12 | 5 | 9 | 0 | 7 |
|---|---|---|---|---|---|---|---|---|---|---|---|---|---|---|---|
| 0 | 15 | 7 | 4 | 14 | 2 | 13 | 1 | 10 | 6 | 12 | 11 | 9 | 5 | 3 | 8 |
| 4 | 1 | 14 | 8 | 13 | 6 | 2 | 11 | 15 | 12 | 9 | 7 | 3 | 10 | 5 | 0 |
| 15 | 12 | 8 | 2 | 4 | 9 | 1 | 7 | 5 | 11 | 3 | 14 | 10 | 0 | 6 | 13 |

$S_2$

| 15 | 1 | 8 | 14 | 6 | 11 | 3 | 4 | 9 | 7 | 2 | 13 | 12 | 0 | 5 | 10 |
|---|---|---|---|---|---|---|---|---|---|---|---|---|---|---|---|
| 3 | 13 | 4 | 7 | 15 | 2 | 8 | 14 | 12 | 0 | 1 | 10 | 6 | 9 | 11 | 5 |
| 0 | 14 | 7 | 11 | 10 | 4 | 13 | 1 | 5 | 8 | 12 | 6 | 9 | 3 | 2 | 15 |
| 13 | 8 | 10 | 1 | 3 | 15 | 4 | 2 | 11 | 6 | 7 | 12 | 0 | 5 | 14 | 9 |

$S_3$

| 10 | 0 | 9 | 14 | 6 | 3 | 15 | 5 | 1 | 13 | 12 | 7 | 11 | 4 | 2 | 8 |
|---|---|---|---|---|---|---|---|---|---|---|---|---|---|---|---|
| 13 | 7 | 0 | 9 | 3 | 4 | 6 | 10 | 2 | 8 | 5 | 14 | 12 | 11 | 15 | 1 |
| 13 | 6 | 4 | 9 | 8 | 15 | 3 | 0 | 11 | 1 | 2 | 12 | 5 | 10 | 14 | 7 |
| 1 | 10 | 13 | 0 | 6 | 9 | 8 | 7 | 4 | 15 | 14 | 3 | 11 | 5 | 2 | 12 |

$S_4$

| 7 | 13 | 14 | 3 | 0 | 6 | 9 | 10 | 1 | 2 | 8 | 5 | 11 | 12 | 4 | 15 |
|---|---|---|---|---|---|---|---|---|---|---|---|---|---|---|---|
| 13 | 8 | 11 | 5 | 6 | 15 | 0 | 3 | 4 | 7 | 2 | 12 | 1 | 10 | 14 | 9 |

TABLE #3-continued

Primitive Functions. ($S_1, S_2, \ldots S_8$)

| 10 | 6  | 9  | 0  | 12 | 11 | 7  | 13 | 15 | 1  | 3  | 14 | 5  | 2  | 8  | 4  |
| 3  | 15 | 0  | 6  | 10 | 1  | 13 | 8  | 9  | 4  | 5  | 11 | 12 | 7  | 2  | 14 |

$S_5$

| 2  | 12 | 4  | 1  | 7  | 10 | 11 | 6  | 8  | 5  | 3  | 15 | 13 | 0  | 14 | 9  |
| 14 | 11 | 2  | 12 | 4  | 7  | 13 | 1  | 5  | 0  | 15 | 10 | 3  | 9  | 8  | 6  |
| 4  | 2  | 1  | 11 | 10 | 13 | 7  | 8  | 15 | 9  | 12 | 5  | 6  | 3  | 0  | 14 |
| 11 | 8  | 12 | 7  | 1  | 14 | 2  | 13 | 6  | 15 | 0  | 9  | 10 | 4  | 5  | 3  |

$S_6$

| 12 | 1  | 10 | 15 | 9  | 2  | 6  | 8  | 0  | 13 | 3  | 4  | 14 | 7  | 5  | 11 |
| 10 | 15 | 4  | 2  | 7  | 12 | 9  | 5  | 6  | 1  | 13 | 14 | 0  | 11 | 3  | 8  |
| 9  | 14 | 15 | 5  | 2  | 8  | 12 | 3  | 7  | 0  | 4  | 10 | 1  | 13 | 11 | 6  |
| 4  | 3  | 2  | 12 | 9  | 5  | 15 | 10 | 11 | 14 | 1  | 7  | 6  | 0  | 8  | 13 |

$S_7$

| 4  | 11 | 2  | 14 | 15 | 0  | 8  | 13 | 3  | 12 | 9  | 7  | 5  | 10 | 6  | 1  |
| 13 | 0  | 11 | 7  | 4  | 9  | 1  | 10 | 14 | 3  | 5  | 12 | 2  | 15 | 8  | 6  |
| 1  | 4  | 11 | 13 | 12 | 3  | 7  | 14 | 10 | 15 | 6  | 8  | 0  | 5  | 9  | 2  |
| 6  | 11 | 13 | 8  | 1  | 4  | 10 | 7  | 9  | 5  | 0  | 15 | 14 | 2  | 3  | 12 |

$S_8$

| 13 | 2  | 8  | 4  | 6  | 15 | 11 | 1  | 10 | 9  | 3  | 14 | 5  | 0  | 12 | 7  |
| 1  | 15 | 13 | 8  | 10 | 3  | 7  | 4  | 12 | 5  | 6  | 11 | 0  | 14 | 9  | 2  |
| 7  | 11 | 4  | 1  | 9  | 12 | 14 | 2  | 0  | 6  | 10 | 13 | 15 | 3  | 5  | 8  |
| 2  | 1  | 14 | 7  | 4  | 10 | 8  | 13 | 15 | 12 | 9  | 0  | 3  | 5  | 6  | 11 |

TABLE #4

Permutation Function (P)

| 16 | 7  | 20 | 21 |
| 29 | 12 | 28 | 17 |
| 1  | 15 | 23 | 26 |
| 5  | 18 | 31 | 10 |
| 2  | 8  | 24 | 14 |
| 32 | 27 | 3  | 9  |
| 19 | 13 | 30 | 6  |
| 22 | 11 | 4  | 25 |

TABLE 5

Inverse Initial Permutation. ($IP^{-1}$)

| 40 | 8 | 48 | 16 | 56 | 24 | 64 | 32 |
| 39 | 7 | 47 | 15 | 55 | 23 | 63 | 31 |
| 38 | 6 | 46 | 14 | 54 | 22 | 62 | 30 |
| 37 | 5 | 45 | 13 | 53 | 21 | 61 | 29 |
| 36 | 4 | 44 | 12 | 52 | 20 | 60 | 28 |
| 35 | 3 | 43 | 11 | 51 | 19 | 59 | 27 |
| 34 | 2 | 42 | 10 | 50 | 18 | 58 | 26 |
| 33 | 1 | 41 | 9  | 49 | 17 | 57 | 25 |

TABLE #6

Permuted Choice 1 (PC-1)

Ce

| 57 | 49 | 41 | 33 | 25 | 17 | 9  |
| 1  | 58 | 50 | 42 | 34 | 26 | 18 |
| 10 | 2  | 59 | 51 | 43 | 35 | 27 |
| 19 | 11 | 3  | 60 | 52 | 44 | 36 |

De

| 63 | 55 | 47 | 39 | 31 | 23 | 15 |
| 7  | 62 | 54 | 46 | 38 | 30 | 22 |
| 14 | 6  | 61 | 53 | 45 | 37 | 29 |
| 21 | 13 | 5  | 28 | 20 | 12 | 4  |

TABLE #7

Shift Schedule

| Iteration Number | Number of Left Shifts |
|---|---|
| 1 | 1 |
| 2 | 1 |
| 3 | 2 |
| 4 | 2 |
| 5 | 2 |
| 6 | 2 |
| 7 | 2 |
| 8 | 2 |

TABLE #7-continued

Shift Schedule

| Iteration Number | Number of Left Shifts |
|---|---|
| 9 | 1 |
| 10 | 2 |
| 11 | 2 |
| 12 | 2 |
| 13 | 2 |
| 14 | 2 |
| 15 | 2 |
| 16 | 1 |

TABLE #8

Permuted Choice 2 (PC-2)

| 14 | 17 | 11 | 24 | 1  | 5  |
| 3  | 28 | 15 | 6  | 21 | 10 |
| 23 | 19 | 12 | 4  | 26 | 8  |
| 16 | 7  | 27 | 20 | 13 | 2  |
| 41 | 52 | 31 | 37 | 47 | 55 |
| 30 | 40 | 51 | 45 | 33 | 48 |
| 44 | 49 | 39 | 56 | 34 | 53 |
| 46 | 42 | 50 | 36 | 29 | 32 |

TABLE #9

Inverse Initial Permutation. ($IP^{-1}$)

| 40 | 8 | 48 | 16 | 56 | 24 | 64 | 32 |
| 39 | 7 | 47 | 15 | 55 | 23 | 63 | 31 |
| 38 | 6 | 46 | 14 | 54 | 22 | 62 | 30 |
| 37 | 5 | 45 | 13 | 53 | 21 | 61 | 29 |
| 36 | 4 | 44 | 12 | 52 | 20 | 60 | 28 |
| 35 | 3 | 43 | 11 | 51 | 19 | 59 | 27 |
| 34 | 2 | 42 | 10 | 50 | 18 | 58 | 26 |
| 33 | 1 | 41 | 9  | 49 | 17 | 57 | 25 |

TABLE 10

|    | Din |    |    |    | Dcin |
|---|---|---|---|---|---|
| | 59 | 61 | 13 | 15 | 0 |
| | 49 | 27 | 53 | 39 | 1 |
| | 17 | 3  | 5  | 23 | 2 |
| DL | 57 | 51 | 37 | 55 | 3 |
| | 41 | 1  | 19 | 63 | 4 |
| | 33 | 43 | 45 | 31 | 5 |
| | 9  | 35 | 21 | 7  | 6 |
| | 25 | 11 | 29 | 47 | 7 |
| | 58 | 60 | 12 | 14 | 8 |
| | 48 | 26 | 52 | 38 | 9 |

TABLE 10-continued

| | Din | | | | Dcin |
|---|---|---|---|---|---|
| | 16 | 2 | 4 | 22 | 10 |
| DR | 56 | 50 | 36 | 54 | 11 |
| | 40 | 0 | 18 | 62 | 12 |
| | 32 | 42 | 44 | 30 | 13 |
| | 8 | 34 | 20 | 6 | 14 |
| | 24 | 10 | 28 | 46 | 15 |

TABLE 11

| PGEN Input | | | | Output |
|---|---|---|---|---|
| 6 | 7 | 12 | 13 | 8 |
| 18 | 19 | 24 | 25 | 9 |
| 30 | 31 | 36 | 37 | 10 |
| 42 | 43 | 46 | 47 | 11 |

TABLE 12

Data Check Errors
Error Condition

¬(Dpe(11)⊕Dpe(23)⊕Dpe(33)⊕Dpe(45)⊕Dcpe(0))
¬(Dpe(17)⊕Dpe(40)⊕Dpe(2)⊕Dpe(26)⊕Dcpe(1))
¬(Dpe(34)⊕Dpe(22)⊕Dpe(44)⊕Dpe(8)⊕Dcpe(2))
¬(Dpe(38)⊕Dpe(28)⊕Dpe(14)⊕Dpe(1)⊕Dcpe(3))
¬(Dpe(10)⊕Dpe(20)⊕Dpe(35)⊕Dpe(3)⊕Dcpe(4))
¬(Dpe(4)⊕Dpe(41)⊕Dpe(15)⊕Dpe(27)⊕Dcpe(5))
¬(Dpe(0)⊕Dpe(16)⊕Dpe(32)⊕Dpe(9)⊕Dcpe(6))
¬(Dpe(5)⊕Dpe(39)⊕Dpe(21)⊕Dpe(29)⊕Dcpe(7))
¬(Dpe(6)⊕Dpe(7)⊕Dpe(12)⊕Dpe(13)⊕Dcpe(8))
¬(Dpe(18)⊕Dpe(19)⊕Dpe(24)⊕Dpe(25)⊕Dcpe(9))
¬(Dpe(30)⊕Dpe(31)⊕Dpe(36)⊕Dpe(37)⊕Dcpe(10))

TABLE 12-continued

Data Check Errors
Error Condition

¬(Dpe(42)⊕Dpe(43)⊕Dpe(46)⊕Dpe(47)⊕Dcpe(11))

TABLE 13

S1c
0 0 0 0 0 1 0 0 1 1 1 1 1 1 1 0
1 1 0 0 0 0 0 0 1 1 1 0 1 1 1 0
0 0 0 0 0 1 0 0 1 1 1 0 1 1 1 1
1 1 0 0 0 1 0 0 1 0 1 0 1 1 1 0

S2c
0 0 0 1 1 0 1 0 1 0 1 0 1 1 1 1
1 0 1 0 1 0 0 0 1 1 0 1 1 1 0 1
1 0 0 0 1 0 0 0 1 0 1 1 1 1 0 1
0 0 1 0 1 1 0 0 0 1 0 1 1 1 0 1

S3c
1 1 1 0 1 1 1 1 0 0 1 0 0 0 0 0
0 0 1 1 1 0 1 1 0 0 1 0 1 0 1 0
0 1 0 1 0 1 0 1 0 0 0 1 1 1 0 0
0 1 0 1 1 1 0 0 0 1 0 1 0 0 0 0

S4c
0 0 0 1 1 1 1 0 0 0 0 1 0 1 0 1
0 0 0 1 1 1 1 1 0 0 0 1 0 1 0 1
1 1 1 1 1 0 0 0 1 0 1 0 1 0 0 0
1 1 1 1 1 0 0 1 1 0 1 0 1 0 0 0

S5c
0 1 0 0 0 1 0 1 0 1 1 1 0 1 0 1
0 0 0 1 0 0 0 0 1 1 1 1 1 1 0 1
0 0 0 0 1 0 0 0 1 1 1 1 1 1 1 0
0 0 1 0 0 0 0 0 0 1 1 1 1 0 1 1

S6c
1 0 1 1 1 0 1 0 1 0 1 0 0 0 1 0
1 1 1 1 0 1 1 1 1 0 0 0 1 0 1 0
1 0 0 1 0 0 1 1 0 1 1 1 0 0 0 1
0 1 0 1 1 1 1 1 1 0 0 0 1 1 0 0

S7c
0 0 0 0 1 1 0 0 1 1 1 0 1 1 1 0
0 1 0 0 1 1 0 1 0 1 1 1 0 1 0 1
0 0 0 0 1 1 0 0 1 1 1 0 1 1 1 0
0 0 0 0 0 1 0 0 0 1 1 1 1 1 1 0

S8c
0 0 0 1 1 0 0 1 1 1 0 1 1 1 0
0 1 0 1 1 0 0 1 1 1 0 1 0 1 0
0 0 0 1 1 0 0 1 1 1 0 1 1 1 0
0 0 0 0 1 0 0 1 1 1 1 1 1 1 0

TABLE 14

| Kin | | | | Kcin |
|---|---|---|---|---|
| 41 | 40 | 52 | 61 | 0 |
| 57 | 14 | 33 | 38 | 1 |
| 22 | 17 | 12 | 1 | 2 |
| 37 | 36 | 25 | 50 | 3 |
| 18 | 35 | 28 | 59 | 4 |
| 48 | 19 | 24 | 53 | 5 |
| 9 | 43 | 4 | 8 | 6 |
| 16 | 62 | 26 | 3 | 7 |
| 32 | 56 | 2 | 34 | 8 |
| 58 | 0 | 21 | 27 | 9 |
| 46 | 29 | 60 | 20 | 10 |
| 44 | 13 | 54 | 30 | 11 |
| 5 | 6 | 10 | 11 | 12 |
| 42 | 45 | 49 | 51 | 13 |

TABLE 15

| Kin | | | | Kcin |
|---|---|---|---|---|
| 49 | 48 | 60 | 6 | 0 |
| 0 | 22 | 41 | 46 | 1 |
| 30 | 25 | 20 | 9 | 2 |
| 45 | 44 | 33 | 58 | 3 |
| 26 | 43 | 36 | 2 | 4 |
| 56 | 27 | 32 | 61 | 5 |
| 17 | 51 | 12 | 16 | 6 |
| 24 | 3 | 34 | 11 | 7 |

TABLE 15-continued

| Kin | | | | Kcin |
|---|---|---|---|---|
| 40 | 35 | 10 | 42 | 8 |
| 1 | 8 | 29 | 4 | 9 |
| 54 | 37 | 5 | 28 | 10 |
| 52 | 21 | 62 | 38 | 11 |
| 13 | 14 | 18 | 19 | 12 |
| 50 | 53 | 57 | 59 | 13 |

TABLE 16

Key Check Errors
Error Condition

¬(KCcs(9)⊕KCcs(1)⊕KDcs(44)⊕KDcs(35)⊕Kc(0))
¬(KCcs(7)⊕KDcs(33)⊕KCcs(10)⊕KDcs(30)⊕Kc(1))
¬(KDcs(32)⊕KCcs(12)⊕KDcs(49)⊕KCcs(14)⊕Kc(2))
¬(KDcs(38)⊕KDcs(46)⊕KCcs(11)⊕KCcs(16)⊕Kc(3))
¬(KCcs(20)⊕KDcs(26)⊕KDcs(47)⊕KCcs(23)⊕Kc(4))
¬(KCcs(0)⊕KDcs(52)⊕KCcs(3)⊕KDcs(36)⊕Kc(5))
¬(KCcs(13)⊕KCcs(25)⊕KDcs(50)⊕KCcs(5)⊕Kc(6))
¬(KCcs(4)⊕KDcs(55)⊕KCcs(19)⊕KDcs(54)⊕Kc(7))
¬(KCcs(2)⊕KCcs(27)⊕KCcs(22)⊕KCcs(18)⊕Kc(8))
¬(KCcs(15)⊕KCcs(6)⊕KDcs(40)⊕KDcs(51)⊕Kc(9))
¬(KDcs(29)⊕KDcs(39)⊕KDcs(43)⊕KDcs(48)⊕Kc(10))
¬(KDcs(45)⊕KDcs(41)⊕KDcs(28)⊕KDcs(31)⊕Kc(11))
¬(KDcs(42)⊕KDcs(34)⊕KCcs(21)⊕KDcs(53)⊕Kc(12))
¬(KCcs(17)⊕KDcs(37)⊕KCcs(8)⊕KCcs(24)⊕Kc(13))

TABLE 17

| Kc Bit | Formula | Kc Bit | Formula |
|---|---|---|---|
| Rotate Left 1 Bit | | | |
| 0 | ¬(KCcs(10)⊕KCcs(2)⊕KDcs(45)⊕KDcs(36)) | 1 | ¬(KCcs(8)⊕KDcs(34)⊕KCcs(11)⊕KDcs(31)) |
| 2 | ¬(KDcs(33)⊕KCcs(13)⊕KDcs(50)⊕KCcs(15)) | 3 | ¬(KDcs(39)⊕KDcs(47)⊕KCcs(12)⊕KCcs(17)) |
| 4 | ¬(KCcs(21)⊕KCcs(27)⊕KDcs(48)⊕KCcs(24)) | 5 | ¬(KCcs(1)⊕KDcs(53)⊕KCcs(4)⊕KDcs(37)) |
| 6 | ¬(KCcs(14)⊕KCcs(26)⊕KDcs(51)⊕KCcs(6)) | 7 | ¬(KCcs(5)⊕KDcs(28)⊕KCcs(20)⊕KDcs(55)) |
| 8 | ¬(KCcs(3)⊕KCcs(0)⊕KCcs(23)⊕KCcs(19)) | 9 | ¬(KCcs(16)⊕KCcs(7)⊕KDcs(41)⊕KDcs(52)) |
| 10 | ¬(KDcs(30)⊕KDcs(40)⊕KDcs(44)⊕KDcs(49)) | 11 | ¬(KDcs(46)⊕KDcs(42)⊕KDcs(29)⊕KDcs(32)) |
| 12 | ¬(KDcs(43)⊕KDcs(35)⊕KCcs(22)⊕KDcs(54)) | 13 | ¬(KCcs(18)⊕KDcs(38)⊕KCcs(9)⊕KCcs(25)) |
| Rotate Left 2 Bits | | | |
| 0 | ¬(KCcs(11)⊕KCcs(3)⊕KDcs(46)⊕KDcs(37)) | 1 | ¬(KCcs(9)⊕KDcs(35)⊕KCcs(12)⊕KDcs(32)) |
| 2 | ¬(KDcs(34)⊕KCcs(14)⊕KDcs(51)⊕KCcs(16)) | 3 | ¬(KDcs(40)⊕KDcs(48)⊕KCcs(13)⊕KCcs(18)) |
| 4 | ¬(KCcs(22)⊕KCcs(0)⊕KDcs(49)⊕KCcs(25)) | 5 | ¬(KCcs(2)⊕KDcs(54)⊕KCcs(5)⊕KDcs(38)) |
| 6 | ¬(KCcs(15)⊕KCcs(27)⊕KDcs(52)⊕KCcs(7)) | 7 | ¬(KCcs(6)⊕KDcs(29)⊕KCcs(21)⊕KDcs(28)) |
| 8 | ¬(KCcs(4)⊕KCcs(1)⊕KCcs(24)⊕KCcs(20)) | 9 | ¬(KCcs(17)⊕KCcs(8)⊕KDcs(42)⊕KDcs(53)) |
| 10 | ¬(KDcs(31)⊕KDcs(41)⊕KDcs(45)⊕KDcs(50)) | 11 | ¬(KDcs(47)⊕KDcs(43)⊕KDcs(30)⊕KDcs(33)) |
| 12 | ¬(KDcs(44)⊕KDcs(36)⊕KCcs(23)⊕KDcs(55)) | 13 | ¬(KCcs(19)⊕KDcs(39)⊕KCcs(10)⊕(KCcs(26)) |
| Rotate Right 1 Bit | | | |
| 0 | ¬(KCcs(8)⊕KCcs(0)⊕KDcs(43)⊕KDcs(34)) | 1 | ¬(KCcs(6)⊕KDcs(32)⊕KCcs(9)⊕KDcs(29)) |
| 2 | ¬(KDcs(31)⊕KCcs(11)⊕KDcs(48)⊕KCcs(13)) | 3 | ¬(KDcs(37)⊕KDcs(45)⊕KCcs(10)⊕KCcs(15)) |
| 4 | ¬(KCcs(19)⊕KCcs(25)⊕KDcs(46)⊕KCcs(22)) | 5 | ¬(KCcs(27)⊕KDcs(51)⊕KCcs(2)⊕KDcs(35)) |
| 6 | ¬(KCcs(12)⊕KCcs(24)⊕KDcs(49)⊕KCcs(4)) | 7 | ¬(KCcs(3)⊕KDcs(54)⊕KCcs(18)⊕KDcs(53)) |
| 8 | ¬(KCcs(1)⊕KCcs(26)⊕KDcs(21)⊕KCcs(17)) | 9 | ¬(KCcs(14)⊕KCcs(5)⊕KDcs(39)⊕KDcs(50)) |
| 10 | ¬(KDcs(28)⊕KDcs(38)⊕KDcs(42)⊕KDcs(47)) | 11 | ¬(KDcs(44)⊕KDcs(40)⊕KDcs(55)⊕KDcs(30)) |
| 12 | ¬(KDcs(41)⊕KDcs(33)⊕KCcs(20)⊕KDcs(52)) | 13 | ¬(KCcs(16)⊕KDcs(36)⊕KCcs(7)⊕KCcs(23)) |
| Rotate Right 2 Bits | | | |
| 0 | ¬(KCcs(7)⊕KCcs(27)⊕KDcs(42)⊕KDcs(33)) | 1 | ¬(KCcs(5)⊕KDcs(31)⊕KCcs(8)⊕KDcs(28)) |
| 2 | ¬(KDcs(30)⊕KCcs(10)⊕KDcs(47)⊕KCcs(12)) | 3 | ¬(KDcs(36)⊕KDcs(44)⊕KCcs(9)⊕KCcs(14)) |
| 4 | ¬(KCcs(18)⊕KCcs(24)⊕KDcs(45)⊕KCcs(21)) | 5 | ¬(KCcs(26)⊕KDcs(50)⊕KCcs(1)⊕KDcs(34)) |
| 6 | ¬(KCcs(11)⊕KCcs(23)⊕KDcs(48)⊕KCcs(3)) | 7 | ¬(KCcs(2)⊕KDcs(53)⊕KCcs(17)⊕KDcs(52)) |
| 8 | ¬(KCcs(0)⊕KCcs(25)⊕KCcs(20)⊕KCcs(16)) | 9 | ¬(KCcs(13)⊕KCcs(4)⊕KDcs(38)⊕KDcs(49)) |
| 10 | ¬(KDcs(55)⊕KDcs(37)⊕KDcs(41)⊕KDcs(46)) | 11 | ¬(KCcs(43)⊕KDcs(39)⊕KDcs(54)⊕KDcs(29)) |
| 12 | ¬(KDcs(40)⊕KDcs(32)⊕KCcs(19)⊕KDcs(51)) | 13 | ¬(KCcs(15)⊕KDcs(35)⊕KCcs(6)⊕KCcs(22)) |

TABLE 18

Data Check Errors
Output Data Error Condition

¬(Dpe(9)⊕Dpe(17)⊕Dpe(23)⊕Dpe(31)⊕Dcpe(0))
¬(Dpe(13)⊕Dpe(28)⊕Dpe(2)⊕Dpe(18)⊕Dcpe(1))
¬(Dpe(24)⊕Dpe(16)⊕Dpe(30)⊕Dpe(6)⊕Dcpe(2))
¬(Dpe(26)⊕Dpe(20)⊕Dpe(10)⊕Dpe(1)⊕Dcpe(3))
¬(Dpe(8)⊕Dpe(14)⊕Dpe(25)⊕Dpe(3)⊕Dcpe(4))
¬(Dpe(4)⊕Dpe(29)⊕Dpe(11)⊕Dpe(19)⊕Dcpe(5))
¬(Dpe(32)⊕Dpe(12)⊕Dpe(22)⊕Dpe(7)⊕Dcpe(6))
¬(Dpe(5)⊕Dpe(27)⊕Dpe(15)⊕Dpe(21)⊕Dcpe(7))

We claim:

1. An error checking circuit for a DES unit including means for performing initial permutation of input data means for expanding part of a result of the initial permutation performing means, and means for exclusive Oring a result of the expanding means with a key, said circuit comprising;
   means for exclusive NORing data check bits with key check bits that correspond to the input data which has been expanded and said key, respectively; and
   means for checking a result of the exclusive NORing means against a result of said exclusive ORing to determine if an error has occurred in said DES unit.

2. A circuit as set forth in claim 1 further comprising:
   means for generating additional data check bits that correspond to the expanded input data, and wherein the additional data check bits are input to said exclusive NORing means together with the first said data check bits and said key check bits.

3. A circuit as set forth in claim 1 wherein the means for checking determines parity of groups of bits resulting from said exclusive ORing means with respective bits resulting from said exclusive NORing means.

4. A circuit as set forth in claim 1 wherein said DES unit further includes:
   means for selecting a first permuted choice of an input key;
   means for key shifting the first permuted choice; and
   means for selecting a second permuted choice of a result of the key shifting means to determine the key which is input to the exclusive ORing means for a first iteration of exclusive ORing; and said circuit further comprises
   means for generating key check bits for a second iteration of exclusive NORing based on a result of said first key shifting means.

5. A circuit as set forth in claim 1 wherein said DES unit further includes:
   means for selecting a permuted choice of an input key;
   means for key shifting the permuted choice; and said circuit further comprises
   means for checking a result of the key shifting means against said input key.

6. A circuit as set forth in claim 1 wherein said data check bits for the expanded data account for effects of the expanding means and the exclusive ORing means.

7. An error checking circuit for a DES unit including means for performing initial permutation of input data, means for expanding part of a result of the initial permutation performing means, means for exclusive Oring a result of the expanding means with a key, and means for performing a selection function on a result of the exclusive ORing means, said circuit comprising:
   means for performing a check selection function on the result of said exclusive ORing means to determine if an error has occurred within said DES unit; and
   means for exclusive NORing a result of the check selection function performing means with data check bits for another part of the input data to yield input data for input to the expanding means for a next iteration.

8. A circuit as set forth in claim 7 wherein said DES unit further comprises:
   means for permuting a result of the selection performing means; and
   means for exclusive ORing a result of the permuting means; and wherein the data check bits for said other part of the input data account for effects of the expanding means, both exclusive ORing means, and the selection performing means.

9. An error checking circuit for a DES unit including means for selecting a permuted choice of an input key, and means for key shifting the permuted choice, said circuit comprising;
   means for checking a result of the key shifting means against key check bits which correspond to said input key and bypass the permuted choicing means and key shifting means, to determine if an error has occurred within said key shifting means; and
   means for generating key check bits for a second iteration of computation within said DES unit based on a result of said key shifting means.

10. A circuit as set forth in claim in claim 9 further comprising means for using the generated key check bits as check bits for a data path within said DES unit.

11. A circuit as set forth in claim 9 wherein said DES unit further includes:
   means for performing initial permutation of input data;
   means for expanding part of a result of the initial permutation performing means; and
   means for exclusive ORing a result of the expanding means with a key; and said circuit further comprises:
   means for exclusive NORing data check bits that correspond to the expanded input data with said key check bits; and
   means for checking a result of the exclusive NORing means against a result of said exclusive ORing.

* * * * *